US008464332B2

(12) United States Patent
Lin et al.

(10) Patent No.: US 8,464,332 B2
(45) Date of Patent: Jun. 11, 2013

(54) ACCESS GATEWAY AND METHOD FOR PROVIDING CLOUD STORAGE SERVICE

(75) Inventors: Yu-Chung Lin, Tu-Cheng (TW); Chien-Pan Lai, Tu-Cheng (TW); Chih-Yuan Huang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 153 days.

(21) Appl. No.: 13/072,765

(22) Filed: Mar. 27, 2011

(65) Prior Publication Data
US 2012/0192263 A1 Jul. 26, 2012

(30) Foreign Application Priority Data

Jan. 24, 2011 (CN) .......................... 2011 1 0025733

(51) Int. Cl.
*G06F 21/00* (2006.01)
(52) U.S. Cl.
USPC ........................................... 726/12

(58) Field of Classification Search
USPC ..................... 726/12, 2–3; 713/161
See application file for complete search history.

(56) References Cited

U.S. PATENT DOCUMENTS

2002/0112048 A1* 8/2002 Gruyer et al. ................. 709/224
2012/0147894 A1* 6/2012 Mulligan et al. ......... 370/395.53

* cited by examiner

*Primary Examiner* — Brandon Hoffman
*Assistant Examiner* — Anthony Brown
(74) *Attorney, Agent, or Firm* — Altis Law Group, Inc.

(57) ABSTRACT

An access gateway establishes a link with at least one terminal device via a user interface module, and obtains a cloud storage service list from a backend server. The access gateway selects one cloud storage service from the cloud storage service list, and authenticates one cloud storage service provider server corresponding to the selected cloud storage service to obtain a backend uniform resource locator (URL). The access gateway downloads backend software from the one cloud storage service provider server according to the backend URL, and installs the backend software. The access gateway provides cloud storage service from the one cloud storage service provider server to the at least one terminal device according to the installed backend software.

10 Claims, 4 Drawing Sheets

ACCESS GATEWAY AND METHOD FOR PROVIDING CLOUD STORAGE SERVICE

BACKGROUND

1. Technical Field

The present disclosure relates to network communications, and more particularly to an access gateway and a method for providing cloud storage service.

2. Description of Related Art

With the development of cloud storage technologies, cloud storage service providers are more prevalent. These cloud storage service providers provide cloud storage service for users. The users need to manually install backend software for each cloud storage service provider, and use the cloud storage services provided by each cloud storage service provider via the installed backend software.

However, different cloud storage service providers have different backend software, so the users need to manually install many different kinds of backend software, which is very inconvenient.

BRIEF DESCRIPTION OF THE DRAWINGS

The details of the disclosure, both as to its structure and operation, can best be understood by referring to the accompanying drawing, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
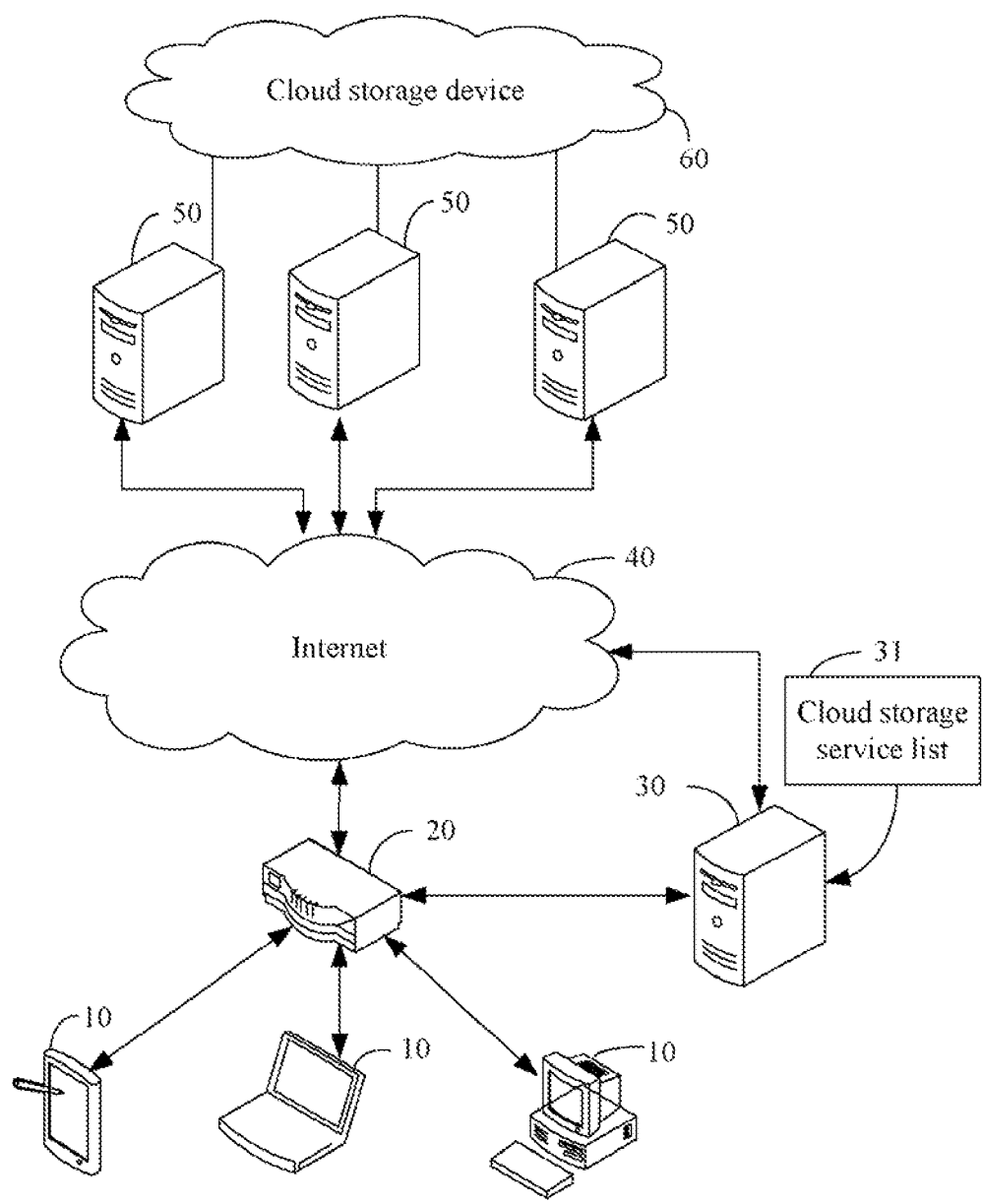
FIG. 1 is a schematic diagram of an application environment of one embodiment of an access gateway in accordance with the present disclosure.

FIG. 1 is a schematic diagram of an application environment of one embodiment of an access gateway 20 in accordance with the present disclosure. In one embodiment, the access gateway 20 is in electronic communication with a plurality of terminal devices 10 and a backend server 30, and also in electronic communication with a plurality of cloud storage service provider servers 50 via the Internet 40. In one non-limiting example, the terminal devices 10 may be tablet computers, palm computers, notebook computers, etc.

The plurality of cloud storage service provider servers 50 are respectively deployed by a plurality of cloud storage service providers, such as GOOGLE, AMAZON S3, and ZUMODRIVER, to provide cloud storage service. The cloud storage service indicates that the access gateway 20 can access a cloud storage device 60 via the Internet 40 and the cloud storage service provider servers 50. The backend server 30 stores a cloud storage service list 31 including a plurality of cloud storage service corresponding to the plurality of cloud storage service provider servers 50. In one non-limiting example, the plurality of cloud storage service includes cloud storage service of GOOGLE, AMAZON S3, and ZUMODRIVER respectively corresponding to the cloud storage service providing services 50 deployed by GOOGLE, AMAZON S3, and ZUMODRIVER.

In one embodiment, when a user logs in a user interface of the access gateway 20 via one of the terminal devices 10, that is, the access gateway 20 establishes a link with the one terminal device 10. Afterwards, the access gateway 20 obtains the cloud storage service list 31 from the backend server 30, and selects one cloud storage service from the cloud storage service list 31. Then, the access gateway 20 authenticates one of the cloud storage service provider servers 50 corresponding to the selected cloud storage service to obtain a backend uniform resource locator (URL). In one embodiment, the backend URL specifies where backend software is available and a mechanism for retrieving the backend software.

Then, the access gateway 20 downloads the backend software from the one cloud storage service provider server 50 according to the backend URL, and installs the downloaded backend software. The access gateway 20 provides cloud storage service from the one cloud storage service provider server 50 to the plurality of terminal devices 10 according to the installed backend software.

For example, the access gateway 20 establishes a link with one of the terminal devices 10, and then obtains the cloud storage service list 31 that includes cloud storage service of GOOGLE, AMAZON S3, and ZUMODRIVER from the backend server 30. Then the access gateway 20 selects the cloud storage service of GOOGLE from the cloud storage service list 31. Afterwards, the access gateway 20 authenticates the cloud storage service provider server 50 of GOOGL corresponding to the selected cloud storage service of GOOGLE. When the authentication is passed, the cloud storage service provider server 50 of GOOGLE generates a backend URL belonging to the access gateway 20, and transmits the backend URL to the access gateway 20 via the backend server 30. Then, the access gateway 20 receives the backend URL from the cloud storage service provider server 50 of GOOGLE via the backend server 30, downloads backend software from the cloud storage service provider server 50 of GOOGLE according to the backend URL, and installs the downloaded backend software. Finally, the access gateway 20 provides cloud storage service of GOOGLE from the cloud storage service provider server 50 of GOOGLE to the plurality of terminal devices 10 according to the installed backend software. That is, the plurality of terminal devices 10 can access the cloud storage device 60 via the access gateway 20, the Internet 40, and the cloud storage service provider server 50 of GOOGEL.

It should be understood that the access gateway 20 selects only one cloud storage service such as the cloud storage service of GOOGLE by way of example only and not by way of limitation. For example, the access gateway 20 interacting with a manager can select three cloud storage service including cloud storage service of GOOGLE, AMAZON S3, and ZUMODRIVER, and obtains cloud storage spaces 10 GB, 20 GB, 30 GB from the cloud storage service provider servers 50 of GOOGLE, AMAZON S3, and ZUMODRIVER, respectively. As such, the terminal devices 10 connected to the access gateway 20 can enjoy a total cloud storage space of (10 GB+20 GB+20 GB=50 GB). Then, the manager of the access gateway 20 can distribute the total cloud storage space of 50 G to the terminal devices 10 according to requirements of the terminal devices 10.

Figure 2:
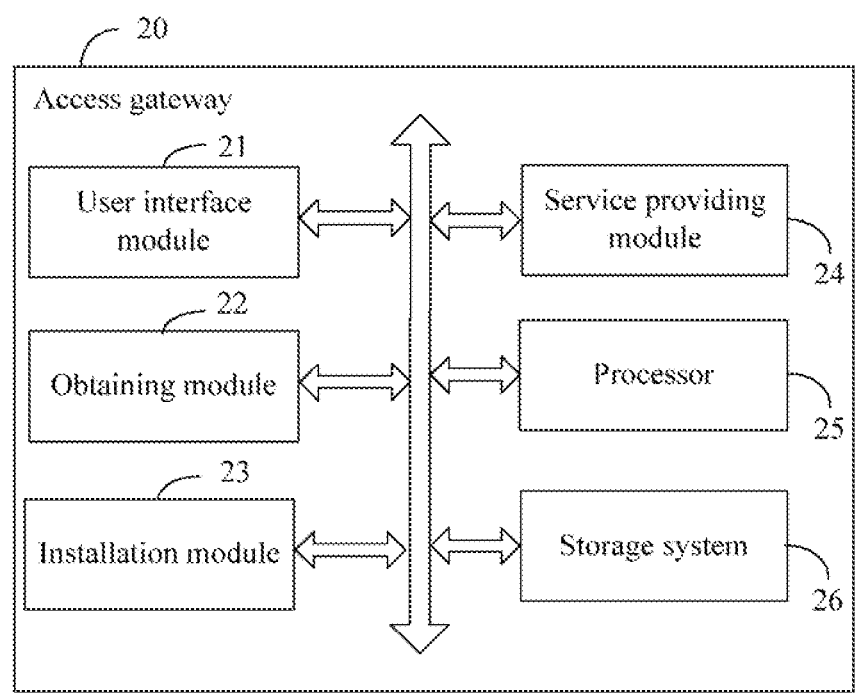
FIG. 2 is a schematic diagram of functional modules of one embodiment of the access gateway in accordance with the present disclosure.

FIG. 2 is a schematic diagram of functional modules of one embodiment of the access gateway 20 in accordance with the present disclosure. In one embodiment, the access gateway 20 includes a user interface module 21, an obtaining module 22, an installation module 23, a service providing module 24, at least one processor 25, and a storage system 26. The modules 21-24 may comprise computerized code in the form of one or more programs that are stored in the storage system 26. The computerized code includes instructions that are executed by the at least one processor 25 to provide functions for the modules 21-24. The storage system 26 may be a hard disk drive, flash memory, or other computerized memory device.

The user interface module 21 is operable to establish a link with one terminal device 10. In one embodiment, a user can log in the user interface module 21 of the access gateway 20 via anyone of the terminal devices 10, and accordingly the user interface module 21 establishes a link with anyone of the terminal devices 10.

The obtaining module 22 is operable to obtain the cloud storage service list 31 from the backend server 30 after the user interface module 21 establishes the link with the terminal device 10, then select one cloud storage service from the cloud storage service list 31.

In one embodiment, the obtaining module 22 requests the backend server 30 for the cloud storage service list 31 according to a simple object access protocol (SOAP), and receives the cloud storage service list 31 from the backend server 30 according to the SOAP. The SOAP is a protocol specification for exchanging structured information in the implementation of web services in computer networks.

The obtaining module 22 is further operable to display the cloud storage service list on the user interface module 21 so that a user selects one cloud storage service from the cloud storage service list 31. Then the obtaining module 22 transmits the selected cloud storage service to the backend server 30.

The obtaining module 22 is further operable to authenticate one cloud storage service provider server 50 corresponding to the selected cloud storage service to obtain a backend URL. In one embodiment, the obtaining module 22 authenticates the cloud storage service provider server 50 according to an open authorization (oAuth) standard, and transmits an account and a password input by a user to the cloud storage service provider server 50. The OAuth standard is an open standard for authorization. In one embodiment, the obtaining module 22 can directly authenticate the cloud storage service provider server 50, or indirectly authenticate the cloud storage service provider server 50 via the backend server 30.

In one embodiment, the cloud storage service provider server 50 generates a backend URL for the access gateway 20 after the account and the password are verified by the cloud storage service provider server 50. Then, the cloud storage service provider server 50 directly transmits the backend URL to the access gateway 20, or indirectly transmits the backend URL to the access gateway 20 via the backend server 30.

The installation module 23 is operable to directly receive the backend URL from the cloud storage service provider server 50, or indirectly receive the backend URL from the cloud storage service provider server 50 via the backend server 30. Then, the installation module 23 downloads backend software from the cloud storage service provider server 50 according to the backend URL, and installs the downloaded backend software.

The service providing module 24 is operable to provide cloud storage service from the cloud storage service provider server 50 to the plurality of terminal devices 10 according to the installed backend software.

Figure 3:
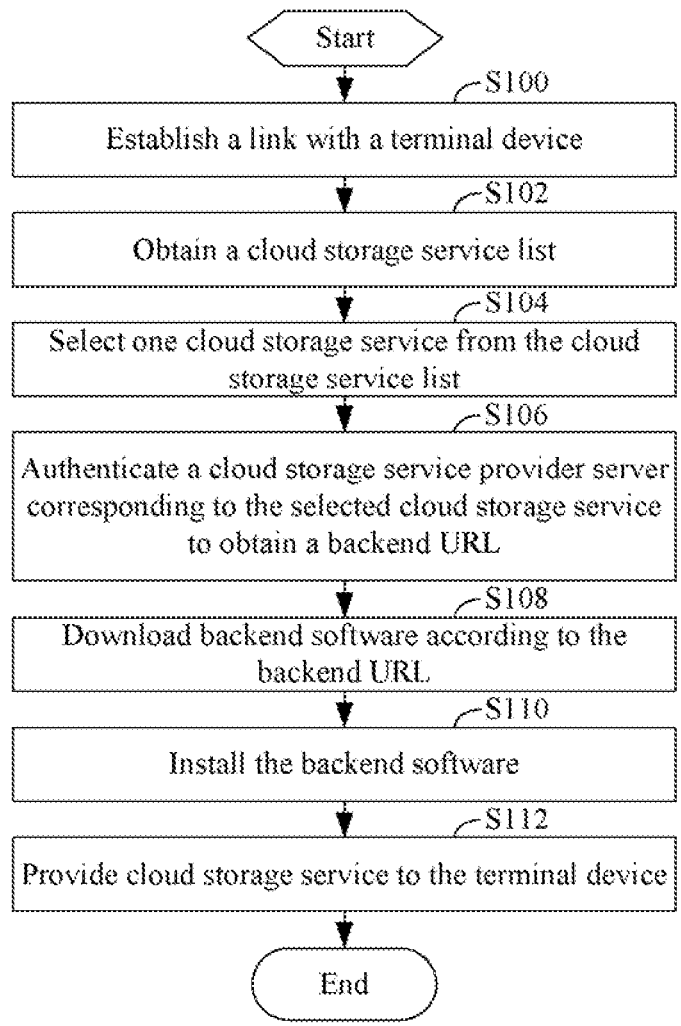
FIG. 3 is a flowchart of one embodiment of a method for providing cloud storage service in accordance with the present disclosure.

FIG. 3 is a flowchart of one embodiment of a method for providing cloud storage service in accordance with the present disclosure. The method may be embodied in the access gateway 20, and is executed by the functional modules such as those of FIG. 2. Depending on the embodiment, additional blocks may be added, others deleted, and the ordering of the blocks may be changed while remaining well within the scope of the disclosure.

In block S100, the user interface module 21 establishes a link with one terminal device 10.

In block S102, the obtaining module 22 obtains the cloud storage service list 31 from the backend server 30.

In block S104, the obtaining module 22 selects one cloud storage service from the cloud storage service list 31.

In block S106, the obtaining module 22 authenticates one cloud storage service provider server 50 corresponding to the selected cloud storage service so as to obtain a backend URL.

In block S108, the installation module 23 downloads backend software from the cloud storage service provider server 50 according to the backend URL.

In block S110, the installation module 23 installs the downloaded backend software.

In block S112, the service providing module 24 provides cloud storage service from the cloud storage service provider server 50 to the terminal devices 10.

Figure 4:
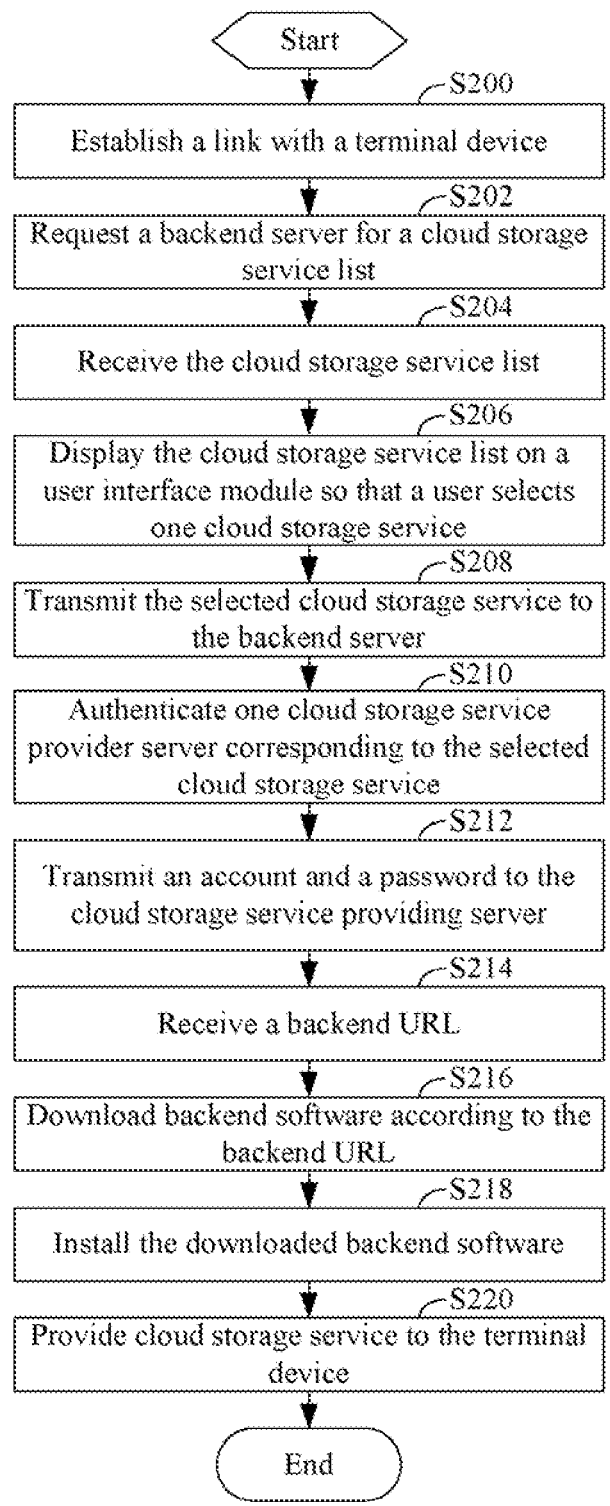
FIG. 4 is a detailed flowchart of the method for providing cloud storage service of FIG. 3.

FIG. 4 is a detailed flowchart of the method for providing cloud storage service of FIG. 3.

In block S200, the user interface module 21 establishes a link with one terminal device 10. In one embodiment, a user can log in the user interface module 21 of the access gateway 20 via the terminal devices 10, and accordingly the user interface module 21 establishes a link with the terminal device 10.

In block S202, the obtaining module 22 requests the backend server 30 for the cloud storage service list 31 according to a SOAP.

In block S204, the obtaining module 22 receives the cloud storage service list 31 from the backend server 30 according to the SOAP.

In block S206, the obtaining module 22 displays the cloud storage service list 31 on the user interface module 21 so that a user selects one cloud storage service from the cloud storage service list 31.

In block S208, the obtaining module 22 transmits the selected cloud storage service to the backend server 30.

In block S210, the obtaining module 22 authenticates one cloud storage service provider server 50 corresponding to the selected cloud storage service according to an oAuth standard.

In block S212, the obtaining module 22 transmits an account and a password input by a user to the cloud storage service provider server 50. In one embodiment, the obtaining module 22 can directly transmit the account and the password to the cloud storage service provider server 50, or indirectly transmit the account and the password to the cloud storage service provider server 50 via the backend server 30.

In one embodiment, the cloud storage service provider server 50 generates a backend URL for the access gateway 20 after the account and the password are verified by the cloud storage service provider server 50. Then, the cloud storage service provider server 50 directly transmits the backend URL to the access gateway 20, or indirectly transmits the backend URL to the access gateway 20 via the backend server 30.

In block S214, the obtaining module 22 directly receives the backend URL from the cloud storage service provider server 50, or indirectly receives the backend URL from the cloud storage service provider server 50 via the backend server 30.

In block S216, the installation module 23 downloads backend software from the cloud storage service provider server 50 according to the backend URL.

In block S218, the installation module 23 installs the downloaded backend software.

In block S220, the service providing module 24 provides cloud storage service from the cloud storage service provider server 50 to the plurality of terminal devices 10 according to the installed backend software.

In conclusion, the access gateway 20 can automatically download and install the backend software corresponding to the selected cloud storage service, and enjoy the selected cloud storage service according to the installed backend software, which is very convenient.

Additionally, the access gateway 20 authenticates the cloud storage service provider server 50 according to the oAuth standard, and transmits the account and the password input by the user to the cloud storage service provider server 50. Thus, the access gateway 20 does not need to store the account and the password, so it is difficult to let out (give away) the account and the password, which assures security of the account and the password.

Furthermore, the access gateway 20 can authenticate the cloud storage service provider server 50 via the backend server 30, and receives the back URL from the cloud storage service provider server 50 via the backend server 30. As such, communication between the access gateway 20 and the cloud storage service provider server 50 passes through the backend server 30, so the backend server 30 can be used to record traffic and control communication security.

While various embodiments and methods of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. An access gateway in electronic communication with a backend server, at least one cloud storage service provider server, and at least one terminal device, the backend server storing a cloud storage service list comprising at least one cloud storage service corresponding to the at least one cloud storage service provider server, the access gateway comprising:
   at least one processor;
   a storage system;
   one or more programs that are stored in the storage system and are executed by the at least one processor, the one or more programs comprising:
      a user interface module operable to establish a link with the at least one terminal device;
      an obtaining module operable to obtain the cloud storage service list from the backend server when the user interface module establishes the link with the at least one terminal device, select one cloud storage service from the cloud storage service list, and authenticate one cloud storage service provider server corresponding to the selected cloud storage service to obtain a backend uniform resource locator (URL) of the access gateway;
      an installment module operable to download backend software from the one cloud storage service provider server according to the backend URL and install the backend software; and
      a service providing module operable to provide cloud storage service from the one cloud storage service provider server to the at least one terminal device according to the installed backend software.

2. The access gateway of claim 1, wherein the obtaining module requests the backend server for the cloud storage service list according to a simple object access protocol, and receive the cloud storage service list from the backend server according to the simple object access protocol.

3. The access gateway of claim 1, wherein the obtaining module is further operable to display the cloud storage service list on the user interface module so that a user selects one cloud storage service from the cloud storage service list.

4. The access gateway of claim 3, wherein the obtaining module is further operable to transmit the selected cloud storage service to the backend server.

5. The access gateway of claim 3, wherein the obtaining module is further operable to authenticate the one cloud storage service provider server according to an open authorization standard, transmit an account and a password input by the user to the one cloud storage service provider server, and receive the backend URL from the one cloud storage service provider server when the account and the password are verified by the one cloud storage service provider server.

6. A method for providing cloud storage service of an access gateway in electronic communication with a backend server, at least one cloud storage service provider server, and at least one terminal device, the backend server storing a cloud storage service list comprising at least one cloud storage service corresponding to the at least one cloud storage service provider server, the method comprising:
   establishing a link with at least one terminal device via a user interface module;
   obtaining the cloud storage service list from the backend server;
   selecting one cloud storage service from the cloud storage service list;
   authenticating one cloud storage service provider server corresponding to the selected cloud storage service to obtain a backend uniform resource locator (URL) of the access gateway;
   downloading backend software from the one cloud storage service provider server according to the backend URL;
   installing the backend software; and
   providing cloud storage service from the one cloud storage service provider server to the at least one terminal device according to the installed backend software.

7. The method of claim 6, wherein the step of obtaining a cloud storage service list from backend server comprises: requesting the backend server for the cloud storage service list according to a simple object access protocol; and receiving the cloud storage service list from the backend server according to the simple object access protocol.

8. The method of claim 6, wherein the selecting step comprises: displaying the cloud storage service list on the user interface module so that a user selects one cloud storage service from the cloud storage service list.

9. The method of claim 8, further comprising: transmitting the selected cloud storage service to the backend server.

10. The method of claim 8, wherein the step of authenticating one cloud storage service provider server corresponding to the selected cloud storage service comprises:

authenticating the one cloud storage service provider server according to an open authorization standard;
transmitting an account and a password input by the user to the one cloud storage service provider server; and
receiving the backend URL from the one cloud storage service provider server when the account and the password are verified by the one cloud storage service provider server.

* * * * *